(12) United States Patent
Ronkainen

(10) Patent No.: US 8,749,349 B2
(45) Date of Patent: Jun. 10, 2014

(54) METHOD APPARATUS AND COMPUTER PROGRAM

(75) Inventor: Sami Ronkainen, Tampere (FI)

(73) Assignee: Nokia Corporation, Espoo (FI)

( * ) Notice: Subject to any disclaimer, the term of this patent is extended or adjusted under 35 U.S.C. 154(b) by 317 days.

(21) Appl. No.: 13/046,016

(22) Filed: Mar. 11, 2011

(65) Prior Publication Data

US 2012/0229276 A1    Sep. 13, 2012

(51) Int. Cl.
*G08B 5/22* (2006.01)
*H04Q 1/30* (2006.01)

(52) U.S. Cl.
USPC ................. 340/7.58; 340/384.1; 340/540

(58) Field of Classification Search
USPC ......... 340/540, 815.45, 815.4, 573.1, 309.16, 340/568.1, 7.58, 6.1, 384.1, 693.5, 407.1; 345/1.1, 117; 701/408; 455/456.1, 567, 455/456.4, 412.2
See application file for complete search history.

(56) References Cited

U.S. PATENT DOCUMENTS

| | | | |
|---|---|---|---|
| 6,831,568 B1 * | 12/2004 | Cortopassi et al. | 340/815.4 |
| 6,850,150 B1 * | 2/2005 | Ronkainen | 340/7.58 |
| 7,250,846 B2 | 7/2007 | Ebling et al. | |
| 7,302,280 B2 | 11/2007 | Hinckley et al. | |
| 7,656,275 B2 * | 2/2010 | Marui | 340/309.16 |
| 7,826,827 B2 * | 11/2010 | Hull et al. | 455/412.2 |
| 7,953,454 B2 * | 5/2011 | Ihara et al. | 455/569.1 |
| 8,355,862 B2 * | 1/2013 | Matas et al. | 701/408 |
| 8,365,099 B2 * | 1/2013 | Cho et al. | 715/863 |
| 2002/0010008 A1 | 1/2002 | Bork et al. | |
| 2009/0005124 A1 | 1/2009 | Elmore | |
| 2009/0249247 A1 | 10/2009 | Tseng et al. | |

FOREIGN PATENT DOCUMENTS

| | | |
|---|---|---|
| EP | 0 954 150 A2 | 11/1999 |
| EP | 1 139 679 A1 | 10/2001 |
| EP | 1 298 941 A2 | 4/2003 |
| WO | WO 99/13628 A1 | 3/1999 |
| WO | WO 02/054363 A1 | 7/2002 |
| WO | WO 03/026270 A1 | 3/2003 |
| WO | WO 2006/065636 A2 | 6/2006 |
| WO | WO 2009/151840 A2 | 12/2009 |
| WO | WO 2010/033955 A1 | 3/2010 |

OTHER PUBLICATIONS

Schmidt, A., et al., "Advanced Interaction in Context"; In Proceedings of the 1st International Symposium on Handheld and Ubiquitous Computing (Karlsruhe, Germany, Sep. 27-29, 1999). H. Gellersen (ed.) Lecture Notes in Computer Science, vol. 1707. London, Springer-Verlag: 89-101.

International Search Report and Written Opinion for Application No. PCT/IB2012/051023 dated Aug. 13, 2012.

* cited by examiner

*Primary Examiner* — Anh V La

(74) *Attorney, Agent, or Firm* — Alston & Bird LLP

(57) ABSTRACT

A method and apparatus and computer program configured to perform the method, the method comprising: enabling an apparatus to provide an alert in response to the occurrence of an event wherein; when the apparatus is determined to be in a particular context a first alert is provided and when the apparatus is determined not to be in the particular context a second, user defined, alert is provided.

14 Claims, 3 Drawing Sheets

METHOD APPARATUS AND COMPUTER PROGRAM

TECHNOLOGICAL FIELD

Figure 1:
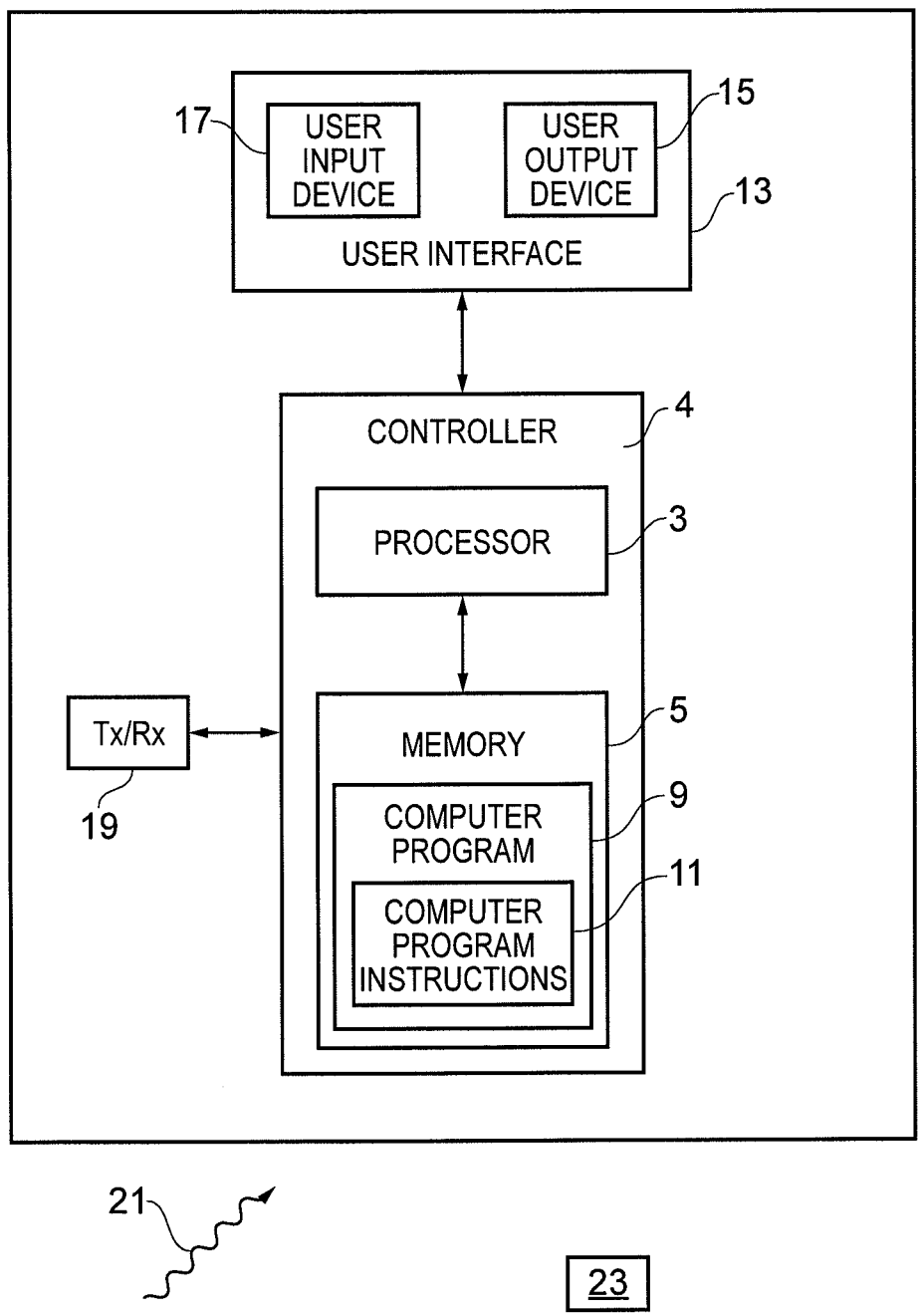

Embodiments of the present invention relate to a method apparatus and computer program. In particular, they relate to a method, apparatus and computer program for providing an alert to a user.

BACKGROUND

Apparatus which provide alerts to a user when an event occurs are known. For example a mobile telephone or other type of electronic device may provide a ringtone or other audio alert when an incoming call is received or if a message is received. Such apparatus may also provide visual alerts such as a notification displayed on a display.

It is useful to provide different alerts in different circumstances. For example if the user is in a meeting they might not want to receive any audio alerts which may interrupt the meeting. Alternatively in other situations it may be beneficial to provide the user with audio alerts.

BRIEF SUMMARY

According to various, but not necessarily all, embodiments of the invention there is provided a method comprising: enabling an apparatus to provide an alert in response to the occurrence of an event wherein; when the apparatus is determined to be in a particular context a first alert is provided and when the apparatus is determined not to be in the particular context a second, user defined, alert is provided.

In some embodiments of the invention the particular context may comprise a function being performed by the apparatus. The function being performed may comprise providing an audio output. The function being performed may comprise a telephone call. The audio output may be provided via earphones.

In some embodiments of the invention the particular context may comprise the position of the apparatus relative to the user.

In some embodiments of the invention the first alert may comprise an audio alert and the second, user defined, alert might not comprise an audio alert.

In some embodiments of the invention the first alert may comprise an audio alert and the second, user defined, alert may comprise a different audio alert.

In some embodiments of the invention the first alert may comprise audio information indicative of the event which has occurred.

In some embodiments of the invention the method may further comprise changing the alert which is provided from the second, user defined alert, to the first alert in response to determining that the apparatus is in the particular context.

In some embodiments of the invention the user defined alert may be defined by the user of the apparatus. The user defined alert may be defined as part of a profile in which a plurality of different events are associated with respective alerts.

In some embodiments of the invention the user defined alert may be provided for a subset of the plurality of events when the apparatus is in the particular context and an alert, different to the user defined alert, may be provided for a second subset of events when the apparatus is determined to be in the particular context.

According to various, but not necessarily all, embodiments of the invention there is also provided an apparatus comprising: at least one processor; and at least one memory including computer program code; wherein the at least one memory and the computer program code are configured to, with the at least one processor, enable the apparatus to: provide an alert in response to the occurrence of an event wherein; when the apparatus is determined to be in a particular context a first alert is provided and when the apparatus is determined not to be in the particular context a second, user defined, alert is provided.

In some embodiments of the invention the particular context may comprise a function being performed by the apparatus. The function being performed may comprise providing an audio output. The function being performed may comprise a telephone call.

In some embodiments of the invention the apparatus may be configured to provide the audio output via earphones.

In some embodiments of the invention the particular context may comprise the position of the apparatus relative to the user.

In some embodiments of the invention the first alert may comprise an audio alert and the second, user defined, alert might not comprise an audio alert.

In some embodiments of the invention the first alert may comprise an audio alert and the second, user defined, alert may comprise a different audio alert.

In some embodiments of the invention the first alert may comprise audio information indicative of the event which has occurred.

In some embodiments of the invention the at least one memory and the computer program code may be configured to, with the at least one processor, enable the apparatus to change the alert which is provided from the second, user defined alert, to the first alert in response to a determination that the apparatus is in the particular context.

In some embodiments of the invention the user defined alert may be defined by the user of the apparatus.

In some embodiments of the invention the user defined alert may be defined as part of a profile in which a plurality of different events are associated with respective alerts.

In some embodiments of the invention the user defined alert may be provided for a subset of the plurality of events when the apparatus is in the particular context and an alert, different to the user defined alert, may be provided for a second subset of events when the apparatus is determined to be in the particular context.

According to various, but not necessarily all, embodiments of the invention there is also provided an apparatus comprising a computer program comprising computer program instructions that, when executed by at least one processor, enable an apparatus at least to perform: enabling an apparatus to provide an alert in response to the occurrence of an event wherein; when the apparatus is determined to be in a particular context a first alert is provided and when the apparatus is determined not to be in the particular context a second, user defined, alert is provided.

In some embodiments of the invention the computer program may comprise program instructions for causing a computer to perform the method of any of the above paragraphs.

In some embodiments of the invention there may be provided a physical entity embodying the computer program as described above.

In some embodiments of the invention there may be provided an electromagnetic carrier signal carrying the computer program as described above.

The apparatus may be for wireless communication.

BRIEF DESCRIPTION

Figure 2:
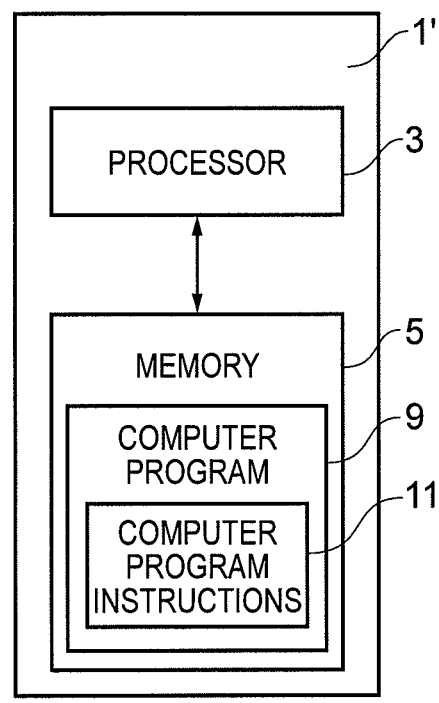
Figure 3:
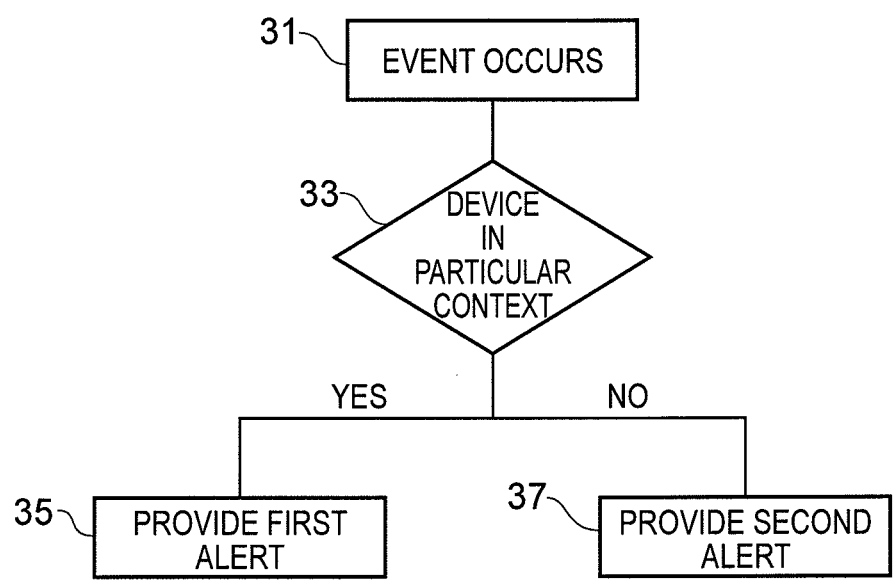

For a better understanding of various examples of embodiments of the present invention reference will now be made by way of example only to the accompanying drawings in which:

FIG. 1 schematically illustrates an apparatus according to an exemplary embodiment of the invention;

FIG. 2 schematically illustrates an apparatus according to another exemplary embodiment of the invention; and FIG. 3 is a block diagram which schematically illustrates a method according to an exemplary embodiment of the invention.

DETAILED DESCRIPTION

The Figures illustrate a method comprising: enabling an apparatus 1 to provide an alert in response to the occurrence of an event wherein; when the apparatus 1 is determined to be in a particular context a first alert is provided and when the apparatus 1 is determined not to be in the particular context a second, user defined, alert is provided.

FIG. 1 schematically illustrates an apparatus 1 according to an embodiment of the invention. The apparatus 1 may be an electronic apparatus. The apparatus 1 may be, for example, a mobile cellular telephone, a tablet computer, a personal computer, a camera, a gaming device, a personal digital assistant, a personal music player or any other apparatus which may provide alerts to a user. The apparatus 1 may be a handheld apparatus 1 which can be carried in a user's hand, handbag or jacket pocket for example.

Only features referred to in the following description are illustrated in FIG. 1. However, it should be understood that the apparatus 1 may comprise additional features that are not illustrated.

The apparatus 1 illustrated in FIG. 1 comprises: a user interface 13, a controller 4 and a transceiver 19. In the illustrated embodiment the controller 4 comprises at least one processor 3 and at least one memory 5 and the user interface 13 comprises a user output device 15 and a user input device 17. In the illustrated embodiment the transceiver 19 is shown as a single entity. It would be appreciated by a person skilled in the art that the transceiver 19 may comprise one or more separate receivers and transmitters.

The controller 4 provides means for controlling the apparatus 1. The controller 4 may be implemented using instructions that enable hardware functionality, for example, by using executable computer program instructions 11 in one or more general-purpose or special-purpose processors 3 that may be stored on a computer readable storage medium 23 (e.g. disk, memory etc) to be executed by such processors 3.

The controller 4 may be configured to control the apparatus 1 to perform a plurality of different functions. For example, where the apparatus 1 is a mobile cellular telephone the controller 4 may be configured to control the apparatus 1 to make and receive telephone calls and to send and receive messages such as SMS (short message service) messages or MMS (multimedia message service) messages. The apparatus 1 may also be configured to perform other functions such as access communication networks such as local area networks or the internet.

In some embodiments of the invention the controller 4 may also be configured to control the apparatus to enable a user to listen to audio outputs. The audio outputs may comprise audio content which is stored in the one or more memory 5 or which is received by the apparatus 1.

The controller 4 may also be configured to enable the apparatus 1 to provide an alert in response to the occurrence of an event wherein; when the apparatus 1 is determined to be in a particular context a first alert is provided and when the apparatus 1 is determined not to be in the particular context a second, user defined, alert is provided.

The at least one processor 3 is configured to receive input commands from the user interface 13 and also to provide output commands to the user interface 13. The at least one processor 3 is also configured to write to and read from the at least one memory 5. Outputs of the user interface 13 are provided as inputs to the controller 4.

The user output device 15 may comprise any means which enables an output to be provided to a user of the apparatus 1. In some embodiments of the invention the user output device 15 may comprise means for providing an audio output to a user. The means for providing the audio output to the user may comprise any means which may be configured to convert an input signal from the controller 4 into an audio output signal which may be provided to a user. For example, the user output device 15 may comprise one or more loudspeakers. In some embodiments of the invention the user output device 15 may be comprised on a separate apparatus which is configured to be coupled to the apparatus illustrated in FIG. 1. For example, the user output device 15 may comprise earphones which may be coupled to the apparatus 1. The coupling may comprise either a wired or wireless connection such as Bluetooth. In some embodiments of the invention if earphones are coupled to the apparatus 1 then all audio outputs may be provided via the earphones rather than a loudspeaker contained within the apparatus 1.

In some embodiments of the invention the user output device 15 may also comprise means for providing visual output to a user. For example, the user output device may comprise a display or any other suitable means.

In some embodiments of the invention the user output device 15 may also comprise means for providing a tactile output to the user of the apparatus 1. For example the user output device 15 may comprise means for causing the apparatus 1 to vibrate.

The user input device 17 provides means for enabling a user of the apparatus 1 to input information which may be used to control the apparatus 1. The user input device 17 may also enable a user to input information which may be stored in the one or more memories 5 of the apparatus 1. The user input device 17 may comprise any means which enables a user to input information into the apparatus 1. For example the user input device 17 may comprise a keypad or a portion of a touch sensitive display or a combination of a number of different types of user input devices.

The apparatus 1 illustrated in FIG. 1 also comprises a transceiver 19. The transceiver 19 may comprise any means which enables the apparatus 1 to transmit and receive information. The transceiver 19 may be configured to enable the apparatus 1 to receive incoming messages and telephone calls. The transceiver 19 may also be configured to enable the apparatus to send messages and initiate telephone calls.

The controller 4 may be configured to provide information to the transceiver 19 for transmission by the transceiver 19 to another apparatus. The controller 4 may also be configured to decode signals received from external apparatus by the transceiver 19 into information. The received information may be stored in the one or more memories 5.

The at least one memory 5 stores a computer program code 9 comprising computer program instructions 11 that control the operation of the apparatus 1 when loaded into the at least one processor 3. The computer program instructions 11 provide the logic and routines that enable the apparatus 1 to perform the methods illustrated in FIG. 3. The at least one processor 3 by reading the at least one memory 5 is able to load and execute the computer program 9.

The computer program instructions 11 may provide computer readable program means configured to control the apparatus 1. The program instructions 11 may provide, when loaded into the controller 4; means for enabling an apparatus 1 to provide an alert in response to the occurrence of an event wherein; when the apparatus 1 is determined to be in a particular context a first alert is provided and when the apparatus 1 is determined not to be in the particular context a second, user defined, alert is provided.

The computer program code 9 may arrive at the apparatus 1 via any suitable delivery mechanism 21. The delivery mechanism 21 may be, for example, a computer-readable storage medium, a computer program product 23, a memory device, a record medium such as a CD-ROM or DVD, an article of manufacture that tangibly embodies the computer program code 9 or any other suitable mechanism. The delivery mechanism may be a signal configured to reliably transfer the computer program code 9. The apparatus 1 may propagate or transmit the computer program code 9 as a computer data signal.

Although the memory 5 is illustrated as a single component it may be implemented as one or more separate components some or all of which may be integrated/removable and/or may provide permanent/semi-permanent/dynamic/cached storage.

References to 'computer-readable storage medium', 'computer program product', 'tangibly embodied computer program' etc. or a 'controller', 'computer', 'processor' etc. should be understood to encompass not only computers having different architectures such as single/multi-processor architectures and sequential (e.g. Von Neumann)/parallel architectures but also specialized circuits such as field-programmable gate arrays (FPGA), application integration specific circuits (ASIC), signal processing devices and other devices. References to computer program, instructions, code etc. should be understood to encompass software for a programmable processor or firmware such as, for example, the programmable content of a hardware device whether instructions for a processor, or configuration settings for a fixed-function device, gate array or programmable logic device etc.

FIG. 2 illustrates an apparatus 1' according to another embodiment of the invention. The apparatus 1' illustrated in FIG. 2 may be a chip or a chip-set. The apparatus 1' comprises at least one processor 3 and at least one memory 5 as described above in relation to FIG. 1.

FIG. 3 illustrates a method according to exemplary embodiments of the invention.

At block 31 an event occurs. The event may comprise an action which occurs at the apparatus 1. The event may be a communication event which may enable the user of the apparatus 1 to communicate with the users of other apparatus. The event may be something which occurs at the apparatus, for example, it may comprise the receipt of an incoming call or an incoming message such as a short message service (SMS) or multimedia message service (MMS). In some embodiments of the invention the event may be a notification of something which occurs externally to the apparatus 1. For example it may comprise a notification that a website or content stored on an external server has been updated. In some embodiments of the invention it may comprise a notification of an update of information relating to a service to which the user subscribes such as a social networking site.

In some embodiments of the invention the events may also comprise a change in the status of the apparatus. For example, the event may be that the power supply available has dropped below a predetermined threshold or that the user is approaching a credit limit. In some embodiments of the invention where the apparatus 1 is a communication apparatus the status may be that the signal strength available has dropped below a predetermined level.

In other exemplary embodiments of the invention the event may comprise the notification of a diary or calendar entry. For example, a user may be able to enter information into a diary or calendar and then a notification may be provided via the apparatus to remind the user about the calendar or diary entry.

At block 33 the context of the apparatus 1 is determined. The context of the apparatus may be an indication of the situation of the apparatus 1.

Determining the context of the apparatus 1 may comprise determining the functions which are currently being performed by the apparatus 1 or applications which are currently being accessed by the apparatus 1. For example, it may be determined that the apparatus 1 is providing an audio output. In some embodiments of the invention the audio output may be part of a communications function such as a telephone call. In other embodiments of the invention the audio output may be part of a media function which enables a user to listen to audio files or view and listen to video files.

In some embodiments of the invention the apparatus 1 may be configured to provide the audio output via a loudspeaker or via earphones as described above in relation to FIG. 1. In such embodiments of the invention determining the context of the apparatus 1 may comprise determining whether or not the apparatus 1 is coupled to earphones.

In some embodiments of the invention determining the context of the apparatus 1 may comprise determining the location of the apparatus 1. For example the apparatus 1 may comprise means for determining the position of the apparatus relative to the user of the apparatus 1. For example it may be determined whether or not the user is holding the apparatus 1 or if the user is holding the apparatus 1 next to their ear, for example, whilst making a telephone call. The means for determining the position of the apparatus 1 may comprise accelerometers, bio-sensors, infra red sensors or any other suitable means.

Determining the context of the apparatus may comprise determining a plurality of different factors. For example it may comprise determining a function currently being performed by the apparatus and the location of the apparatus or determining the function currently being performed by the apparatus and whether or not the apparatus 1 is coupled to earphones. This may enable the apparatus 1 to determine whether or not audio outputs provided by the apparatus 1 are likely to be heard by anyone other than the user of the apparatus 1. For example, if the apparatus 1 is coupled to earphones so that any audio output is provided via the earphones then the audio outputs are unlikely to be heard by anyone other than the user of the apparatus 1. Similarly if the apparatus 1 is currently enabling a telephone call and is determined to be positioned adjacent to the head of the user then it may be determined that the audio outputs provided by the apparatus 1 are unlikely to be heard by anyone other than the user of the apparatus 1.

The context may be determined as either being a particular context or not a particular context. The apparatus 1 may be determined to be in the particular context if it fulfils the criteria associated with the particular context. If the apparatus does not fulfill the criteria associated with the particular context then the apparatus 1 will be determined to be not in the particular context. The criteria associated with a particular context may comprise, for example, whether or not audio outputs provided by the apparatus are likely to be heard by anyone other than the user of the apparatus 1 or if outputs provided by the apparatus are likely to disturb anyone other than the user of the apparatus 1.

The particular context may be a context in which, in response to the occurrence of the event at block 31, it may be determined that it is advantageous to provide a predetermined alert. The predetermined alert may be different to an alert which has been defined by a user of the apparatus 1.

If at block 33 it is determined that the apparatus 1 is in the particular context then at block 35 a first alert is provided. The first alert may be a predetermined alert. The first alert may also be different to an alert which has been selected by the user to be associated with the event.

The first alert may comprise an output which is provided by the apparatus 1 to provide an indication to the user of the apparatus 1 that the event has occurred. The alert may comprise an audio output, a visual output, a tactile output or any combination of these. An audio alert may comprise a ringtone, a beep or series of beeps. In some embodiments of the invention the audio alert may comprise an indication of the event which has occurred for example, the ringtone may provide an indication of the caller or a message announcement may announce who the sender of the message is.

A visual alert may comprise a notification which may be displayed on a user output device such as a display. For example, a notification may be displayed indicating that there is an incoming call or received message or that the power source of the apparatus 1 is running low. In some embodiments of the invention the visual alert may comprise other types of notification. For example a light emitting diode (LED) may be illuminated or flash to indicate that a message has been received or that some event has occurred.

A tactile alert may comprise any feedback which may be felt by the user of the apparatus 1. For example the apparatus may be configured to vibrate so that, if the apparatus 1 is in a user's pocket for example, they could feel the apparatus 1 vibrating.

If at block 33 it is determined that the apparatus 1 is not in the particular context then at block 37 a second alert is provided. The second alert may be a user selected alert. The user of the apparatus 1 may be able to use the user input device 17 to select an alert to be associated with one or more events. The second alert may comprise an audio, visual or tactile alert as described above.

In some embodiments of the invention the user may be able to select an alert profile which associates each of a plurality of events with a respective alert. In some profiles different events may be associated with the same alert or different events may be associated with different alerts.

Embodiments of the invention provide the advantage that they enable the most appropriate alert to be provided based on the context of the apparatus 1 even if this is not the alert which has been selected by the user of the apparatus 1.

For example, in some embodiments of the invention the user may select an alert profile in which no audio alerts are provided. For example, they may be in a situation where they do not wish to be disturbed such as a meeting. Or they may be in a situation where they do not wish to disturb other people such as a library or a cinema. In such a situation the user may select tactile or visual alerts to be associated with events.

However, in some circumstances it may be determined that it may be more advantageous to provide an audio alert than to provide the user selected alert. For example, if it is determined that the apparatus 1 is coupled to earphones then it may be beneficial to provide an audio alert even if the user has selected a non-audio alert because only the user of the apparatus 1 would hear the alert and so this would not disturb other people in the vicinity of the user.

As another example the user of the apparatus 1 may be making a telephone call, for example, they may have left a meeting to make or answer a telephone call. In order to make the telephone call the user may be holding the apparatus 1 adjacent to their ear so they might not be able see any visual alerts which may be provided on a display. In such circumstances it may determined that it is more beneficial to provide an audio alert as the user would not be able to see a visual alert and, as the apparatus 1, is positioned next to the ear of the user, only the user of the apparatus would be able to hear the alert.

In some embodiments of the invention the alert which is provided may be dependent upon the event which occurs. For example an audio alert may only be provided for critical events. For example, a user may receive an audio alert in the particular context if the status of the apparatus 1 is determined as being low credit or low power as this could result in a telephone call or other function being terminated. Other events may be determined to be non-critical and so the user selected alert may still be provided as the user may be able to deal with these events later. For example an incoming SMS or email message may not trigger an audio alert, even in the particular context, because these may be considered to be events which a user could deal with at a later time.

The user may have selected an audio profile in which a plurality of different events are associated with respective alerts. The plurality of different events may comprise a first subset of events for which a user defined alert is provided both when the apparatus 1 is in the particular context and when the apparatus 1 is not in the particular context and a second subset of events for which a user defined alert is provided when the apparatus is not in the particular context but a different alert is provided when the apparatus is in the particular context. The second subset of events may comprise the critical events as described above, such as a low power supply. The first subset of events may comprise non-critical events such as the receipt of a message such as a text message.

In other embodiments of the invention the particular context of the apparatus could be that the apparatus 1 is in a voice activated mode of input. For example, the user input means 17 may be configured to enable the user to control the apparatus 1 using voice inputs. Alternatively the user could be recording a voice memo or using any other function which would be sensitive to the surrounding sounds.

In such embodiments of the invention it may be considered that it is beneficial not to provide an audio alert even if this is what has been selected by the user of the apparatus 1 as the audio alert may interfere with the voice inputs. In such embodiments of the invention the predetermined input which is provided at block 35 might not comprise any audio alerts. For example, it might comprise only a visual alert. In other embodiments the predetermined alert which is provided at block 35 may comprise a different audio alert to the one which has been selected by a user. For example, rather than providing a ringtone to indicate an incoming call a shorter version or a single beep may be provided instead.

In other embodiments of the invention the user selected alerts may comprise both an audio alert and a visual alert. The audio alert may comprise a simple beep or other similar noise and may simply provide an alert that an event has occurred whilst the visual alert which accompanies the beep may provide more information to the user to indicate what the event is. For example, a notification of the type of incoming message, the identity of the incoming caller or the amount of power or credit remaining may be displayed on the display.

In these embodiments of the invention the user might not be able to decode the alerts if they cannot see the display, for example, if they are making a telephone call and holding the apparatus 1 adjacent to their ear. Therefore if the context of the apparatus is 1 is determined to be one in which the user may have difficulty decoding the user selected audio alert a different audio alert may be provided. The different audio alert may comprise audio information indication of the type of event which has occurred. The audio information may comprise speech which indicates the type of event which has occurred. In other embodiments of the invention the audio information may comprise a beep or series of beeps which is associated with a particular event.

Therefore the embodiments of the invention provide the advantage that they enable the most appropriate alerts to be provided even if the user has selected a different alert. In such situations the embodiments of the invention provide the further advantage that they enable a suitable alert to be provided to the user without the user having to manually change any of the alerts that they have selected. This may be beneficial if, for example, a user has not remembered to change or has not had the opportunity to change the alerts that they have selected. For example, if a user selects a silent alert profile when they are in a meeting and then does not have the opportunity or does not remember to change the selected profile before they make a telephone call.

Embodiments of the invention also provide the advantage that they enable the context of the apparatus 1 to be determined easily. For example if an apparatus is determined to be in a particular context whenever the apparatus 1 is coupled to a set of earphones this can be determined without requiring complicated processing methods or any extra sensors. If the context is determined based on a plurality of factors such as a current function of the apparatus and a location of the apparatus then this may provide a simple way of determining the context because each of the factors may be easily determined. Furthermore by requiring the combination of a plurality of different factors this may reduce the chances of the context being determined incorrectly.

The blocks illustrated in the FIG. 3 may represent steps in a method and/or sections of code in the computer program 9. The illustration of a particular order to the blocks does not necessarily imply that there is a required or preferred order for the blocks and the order and arrangement of the blocks may be varied. For example the determination of the context of the apparatus may occur before the event occurs. For example, in some embodiments of the invention the apparatus 1 may be configured to determine whenever the apparatus 1 enters the particular context and change the alerts associated with the events accordingly. The alerts associated with the events may be automatically changed back to the user selected alerts once it is determined that the apparatus 1 is no longer in the particular context. Furthermore, it may be possible for some blocks to be omitted.

Although embodiments of the present invention have been described in the preceding paragraphs with reference to various examples, it should be appreciated that modifications to the examples given can be made without departing from the scope of the invention as claimed.

Features described in the preceding description may be used in combinations other than the combinations explicitly described.

Although functions have been described with reference to certain features, those functions may be performable by other features whether described or not.

Although features have been described with reference to certain embodiments, those features may also be present in other embodiments whether described or not.

Whilst endeavoring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

I claim:

1. A method comprising:
enabling an apparatus to determine whether the apparatus is in a particular context by determining whether at least one defined function is currently being performed by the apparatus;
enabling the apparatus to provide a first alert in response to the occurrence of an event in an instance the apparatus is determined to be in the particular context; and
enabling the apparatus to provide a second, user defined, alert in response to the occurrence of the event in an instance the apparatus is determined not to be in the particular context;
wherein the at least one defined function consists of at least one of (i) providing an audio output; (ii) receiving an audio input; or (iii) providing a telephone call.

2. A method as claimed in any of claim 1 wherein the audio output is provided via earphones.

3. A method as claimed in claim 1 wherein said determining further comprises determining the position of the apparatus relative to the user.

4. A method as claimed in claim 1 wherein the first alert comprises an audio alert and the second, user defined, alert does not comprise an audio alert.

5. A method as claimed in claim 1 wherein the first alert comprises an audio alert and the second, user defined, alert comprises a different audio alert.

6. A method as claimed in claim 1 wherein the first alert comprises audio information indicative of the event which has occurred.

7. A method as claimed in claim 1 further comprising changing the alert which is provided from the second, user defined alert, to the first alert in response to determining that the apparatus is in the particular context.

8. A method as claimed in claim 1 wherein the user defined alert is defined by the user of the apparatus.

9. A method as claimed in claim 1 wherein the user defined alert is defined as part of a profile in which a plurality of different events are associated with respective alerts.

10. A method as claimed in claim 9 wherein the user defined alert is provided for a subset of the plurality of events when the apparatus is in the particular context and an alert, different to the user defined alert, is provided for a second subset of events when the apparatus is determined to be in the particular context.

11. A computer program stored on a non-transitory computer-readable medium, said computer program comprising program instructions for causing a computer to perform the method of claim 1.

12. An apparatus comprising:
at least one processor; and
at least one memory including computer program code;
wherein the at least one memory and the computer program code are configured to, with the at least one processor, enable the apparatus to:

determine whether the apparatus is in a particular context by determining whether at least one defined function is currently being performed by the apparatus;

provide a first alert in response to an occurrence of an event in an instance the apparatus is determined to be in the particular context; and provide a second, user defined, alert in response to the occurrence of the event in an instance the apparatus is determined not to be in the particular context;

wherein the at least one defined function consists of at least one of (i) providing an audio output; (ii) receiving an audio input; or (iii) providing a telephone call.

13. An apparatus as claimed in claim 12 wherein the apparatus is configured to provide the audio output via earphones.

14. A computer program stored on a non-transitory computer-readable medium, said computer program comprising computer program instructions that, when executed by at least one processor, enable an apparatus at least to perform:

enabling an apparatus to determine whether the apparatus is in a particular context by determining whether at least one defined function is currently being performed by the apparatus;

enabling the apparatus to provide a first alert in response to an occurrence of an event in an instance the apparatus is determined to be in the particular context; and enabling the apparatus to provide a second, user defined, alert in response to the occurrence of the event in an instance the apparatus is determined not to be in the particular context;

wherein the at least one defined function consists of at least one of (i) providing an audio output; (ii) receiving an audio input; or (iii) providing a telephone call.

* * * * *